(12) United States Patent
Mihan et al.

(10) Patent No.: US 6,911,516 B1
(45) Date of Patent: Jun. 28, 2005

(54) COPOLYMERS OF ETHYLENE WITH $C_3$-$C_{12}$ α-OLEFINS

(75) Inventors: Shahram Mihan, Ludwigshafen (DE); Dieter Lilge, Limburgerhof (DE); Günther Schweier, Friedelsheim (DE); Markus Endres, Heidelberg (DE)

(73) Assignee: Basell Polyolefine GmbH, Frankfurt am Main (DE)

( * ) Notice: Subject to any disclaimer, the term of this patent is extended or adjusted under 35 U.S.C. 154(b) by 0 days.

(21) Appl. No.: 10/069,438

(22) PCT Filed: Aug. 1, 2000

(86) PCT No.: PCT/EP00/07443

§ 371 (c)(1),
(2), (4) Date: Jul. 12, 2002

(87) PCT Pub. No.: WO01/12687

PCT Pub. Date: Feb. 22, 2001

(30) Foreign Application Priority Data

Aug. 13, 1999 (DE) .......................... 199 37 863

(51) Int. Cl.⁷ .......................... C08F 210/02; C08F 4/60
(52) U.S. Cl. ................... 526/348; 526/160; 526/348.2; 526/348.6
(58) Field of Search ................ 526/160, 348, 526/348.2, 348.6

(56) References Cited

U.S. PATENT DOCUMENTS

| | | | | |
|---|---|---|---|---|
| 3,125,547 | A | 3/1964 | Blatz | 260/45.5 |
| 3,242,150 | A | 3/1966 | Scoggin | 260/88.2 |
| 3,248,179 | A | 4/1966 | Norwood | 23/285 |
| 5,008,204 | A | 4/1991 | Stehling | 436/85 |
| 5,561,092 | A | 10/1996 | Ewen et al. | 502/117 |
| 5,763,549 | A | 6/1998 | Elder et al. | 526/153 |
| 5,807,939 | A | 9/1998 | Elder et al. | 526/160 |
| 5,883,202 | A | 3/1999 | Ewen et al. | 526/124.2 |
| 6,255,418 | B1 | 7/2001 | Jolly et al. | 526/160 |
| 6,388,115 | B1 * | 5/2002 | Crowther et al. | |
| 6,476,166 | B1 * | 11/2002 | Holtcamp et al. | |
| 6,506,866 | B2 * | 1/2003 | Jacobsen et al. | |

FOREIGN PATENT DOCUMENTS

| | | |
|---|---|---|
| CA | 2260003 | 12/1998 |
| DE | 197 10 615 | 9/1998 |
| DE | 197 45 047 | 4/1999 |
| EP | 0100843 | 2/1984 |
| EP | 0416815 | 3/1991 |
| EP | 0420436 | 4/1991 |
| EP | 0427697 | 5/1991 |
| EP | 0468537 | 1/1992 |
| EP | 0640627 | 1/1995 |
| EP | 0662989 | 7/1995 |
| EP | 0728160 | 8/1996 |
| EP | 0735059 | 10/1996 |
| EP | 0877051 | 11/1998 |
| WO | 90/03414 | 4/1990 |
| WO | 93/12151 | 6/1993 |
| WO | 93/16116 | 8/1993 |
| WO | 93/03093 | 9/1993 |
| WO | 95/10546 | 4/1995 |
| WO | 95/27005 | 10/1995 |
| WO | 97/36937 | 10/1997 |
| WO | 98/03559 | 1/1998 |
| WO | 98/04570 | 2/1998 |
| WO | 98/44011 | 10/1998 |

OTHER PUBLICATIONS

US 5,625,016, 4/1997, Schiffino et al. (withdrawn)
L. Fieser and M. Fieser, *Lehrbuch Der Organischen Chemie*, 3rd Revised Edition, Verlag Chemie, Weinheim, 1957, Chapter 3, pps. 920–941.
Wild, L., et al, "Determination of Branching Distributions in Polyethylene and Ethylene Copolymers," *J. of Polymer Science: Polymer Physics Ed. 40:* 441–455 (1982)..
Wild, I., et al, "Temperature Rising Elution Fractionation," *Advances in Polymer Science—98:*1–47 (1990).
Strauss, S.H., "The Search for Larger and More Weakly Coordinating Anions," *Chem. Rev. 93:*927–942 (1993).
Bevington, "Gaussian or Normal Error Distribution," *In: Data Reduction and Error Analysis for the Physical Science,* McGraw–Hill, 1969, pp. 43, 44, 45, 72 & 73.

* cited by examiner

*Primary Examiner*—Caixia Lu
(74) *Attorney, Agent, or Firm*—Novak Druce & Quigg, LLP

(57) ABSTRACT

Copolymers of ethylene with $C_3$–$C_{12}$ α-olefin have a polydispersity Mw/Mn of $\leq 10$, a density of from 0.85 to 0.95 g/cm³, a proportion of from 1 to 40% by weight of comonomer and a molar mass Mn above 150,000 g/mol and a comonomer composition distribution breadth index above 70%. A process for their preparation is described, as are their use and fibers, moldings, films and polymer mixtures comprising these copolymers.

14 Claims, No Drawings

COPOLYMERS OF ETHYLENE WITH $C_3$-$C_{12}$ α-OLEFINS

The invention relates to copolymers of ethylene with $C_3$–$C_{12}$ α-olefins, which have a polydispersity Mw/Mn of ≦10, a density of from 0.85 to 0.95 g/cm³, a proportion of from 1 to 40% by weight of comonomer and a molar mass Mn above 150,000 g/mol and a comonomer composition distribution breadth index above 70%, and to a process for their preparation and to their use, and also to fibers, moldings, films and polymer mixtures containing these copolymers.

Copolymers of ethylene with higher α-olefins, such as 1-butene, 1-pentene, 1-hexane or 1-octane, known as LLDPE (linear low-density polyethylene), may be prepared, for example, using traditional Ziegler Natta catalysts based on titanium, or else using metallocenes. The former give LLDPE with a broad composition distribution and with a relatively broad distribution of average molar mass, e.g. Mw/Mn>3, where Mn is the number-average and Mw the weight-average molecular weight. One measure of the composition distribution breadth is the CDBI, the composition distribution breadth index. The CDBI is defined as the percentage by weight of the copolymer molecules whose comonomer content is within 50% of the average comonomer content. It may be determined easily by TREF (temperature rising elution fraction) analyses (Wild et. al. J. Poly. Sci., Poly. Phys. Ed. Vol. 20, (1982), 441, or U.S. Pat. No. 5,008,204).

In contrast, metallocene catalysts, for example, may be used to obtain ethylene copolymers with a narrow molar mass distribution and a CDBI>50%. These LLDPEs have particularly advantageous mechanical properties. Copolymerization with higher α-olefins frequently given rise to a reduced molecular weight. At higher concentrations of comonomer, chain termination is generally increasingly favoured, and the molecular weight thus reduces (U.S. Pat. No. 5,625,016 states that Mn is below about 50,000). The low-molecular-weight copolymers may firstly give rise to deposits in the reactor during the polymerization and can secondly give rise to undesirable product properties, e.g. tacky surfaces. LLDPEs with a high molecular weight and high comonomer content are, in contrast, difficult to prepare.

WO-A-98/44011 describes ethylene polymers with at least one alpha olefin having at least 5 carbon atom and with a melt index MI of from 0.1 to 15, a CDBI of at least 70%, a density of from 0.91 to 0.93 g/ml, a haze value below 20%, a melt index ratio MIR of from 35 to 80, an average module of from 20,000 to 60,000 psi and a defined ratio of modulus to dart impact strength. The polymers obtained moreover contain essentially no unsaturated end groups (page 9, line 16 to 23).

WO-A-93/12151 describes ethylene copolymers with alpha olefins having at least 10 carbon atoms. These have a density of from 0.85 to 0.95 g/cm³, an average molecular weight $M_w$ of from 30,000 to 1,000,000 Dalton and a polydispersity of from 2 to 4.

It is an object of the present invention to find copolymers with high molar masses, a high proportion of comonomer and a high CDBI, and a suitable preparation process for these.

We have found that this object is achieved by copolymers of ethylene with $C_3$–$C_{12}$ α-olefins, which have a polydispersity Mw/Mn of from 1 to 10, density of from 0.85 to 0.95 g/cm³, a proportion of from 1 to 40 mol of comonomer per . . . and a molar mass Mn above 150,000 g/mol and a monomer composition distribution breadth index above 70%.

We have also found a process for preparing the novel ethylene copolymers, which comprises carrying out the process in the presence of the following components:

(A) Substituted monoindenyl- or monofluorenylchromium complexes of formula I

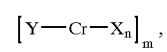

where:

Y has the following formula II

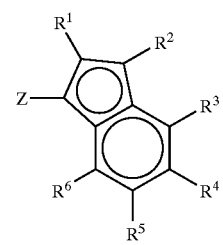

where

Z is an unsubstituted, substituted or condensed heteroaromatic ring system,

X, independently of one another, are fluorine, chlorine, bromine, iodine, hydrogen, $C_1$–$C_{10}$-alkyl, $C_2$–$C_{10}$-alkenyl, $C_6$–$C_{20}$-aryl, alkyaryl having from 1–10 carbon atoms in the alkyl radical and from 6–20 carbon atoms in the aryl radical, $NR^7R^8$, $OR^7$, $SR^7$, $SO_3R^7$, $OC(O)R^7$, CN, SCN, β-diketonate, CO, $BF_4^-$, $PF_6^-$, or bulky noncoordinating anions, $R^1$–$R^8$, independently of one another, are hydrogen, $C_1$–$C_{20}$-alkyl, $C_2$–$C_{20}$-alkenyl, $C_6$–$C_{20}$-aryl, alkylaryl having from 1 to 10 carbon atoms in the alkyl radical and from 6–20 carbon atoms in the aryl radical, $SiR^8_3$, where the organic radicals $R^1$–$R^8$ may also have halogen substitution and any two geminal or vicinal radicals $R^1$–$R^8$ may also have been bonded to give a 5- or 6-membered aromatic or aliphatic ring, $R^9$, independently of one another, are hydrogen, $C_1$–$C_{20}$-alkyl, $C_2$–$C_{20}$-alkenyl, $C_6$–$C_{20}$-aryl, alkylaryl having from 1 to 10 carbon atoms in the alkyl radical, and from 6–20 carbon atoms in the aryl radical, and where in each case two geminal radicals $R^9$ may also have been bonded to give a five- or six-membered ring, n is 1, 2 or 3, and m is 1, 2 or 3, and (B) if desired, one or more activator compounds.

We have also found polymer mixtures which comprise at least one novel copolymer of ethylene with $C_3$–$C_{12}$ α-olefins, and moreover fibers, films and moldings which comprise the novel copolymers of ethylene with $C_3$–$C_{12}$ α-olefins as a substantial component.

The use of the novel copolymers with ethylene with $C_3$–$C_{12}$ α-olefins for producing fibers, films or moldings has also been found.

For the purposes of the present invention and as is known, HLMFR is high load melt flow rate and is always determined at 190° C. with a load of 21.6 kg (190° C./21.6 kg).

The comonomer distribution breadth of the novel copolymers may advantageously be described via the standard deviation of the weighted average elution temperature Ta, as can be determined by TREF. TREF is described, for example, in wild, Advances in Polymer science, 98, pp. 1–47, 57 p, 153, 1992. The weighted average elution temperature (Ta) and the standard deviation (S) are used as follows (see also Bevington, McGraw-Hill, Data Reduction and Error Analysis for the physical Sciences, 1969).

The novel copolymer of ethylene with $C_3$–$C_{12}$ α-olefins has a polydispersity Mw/Mn of ≦10, preferably from 2 to 4 and particularly preferably from 2 to 3.5, a density of from 0.85 to 0.95 g/cm³, preferably from 0.88 to 0.93 g/cm³, and a molar mass Mn above 150,000 g/mol, preferably above 200,000 g/mol, and very particularly preferably above 250,000 g/mol. Its HLMFR is from 0.001 to 20 g/10 min, preferably from 0.01 to 15 g/10 min, and the comonomer composition distribution breadth index is above 70%, preferably above 80% and particularly preferably above 90%.

A preferred embodiment of the novel copolymer has a comonomer composition distribution breadth index above 90% and a polydispersity Mw/Mn of from 2 to 4.

The novel copolymers preferably have a vinyl- or vinylidene-terminated end group.

Possible comonomers which may be present alongside ethylene in the novel copolymer, individually or mixed with one another, are any of the α-olefins having from 3 to 12 carbon atoms, e.g. propene, 1-butene, 1-pentene, 1-hexene, 4-methyl-1-pentene, 1-heptene, 1-octene and 1-decene. A preferred copolymerized comonomer unit present in the ethylene copolymer is that of α-olefins having from 3 to 9 carbon atoms, such as butene, pentene, hexene, 4-methylpentene or octene. Particular preference is given to α-olefins selected from the group consisting of propene, 1-butene, 1-hexene and 1-octene. The amount of the comonomers as copolymerized in the novel ethylene copolymers is generally from 1 to 40% by weight, preferably from 5 to 20% by weight and in particular from 10 to 20% by weight, based in each case on the ethylene copolymer.

The ethylene copolymers may in principle be prepared using any catalyst or catalyst system which give rise to products with the required narrow molar mas distribution. These catalysts are generally those known as single-site-catalysts, preferably the substituted monoindenylchromium complexes described above of the formula I, where at least one of the substituents on the five-membered indenyl ring has an unsubstituted, substituted or condensed, heteroaromatic ring system.

In the complexes according to the invention the indenyl ring has $\eta^5$ bonding to the chromium center. The substituents on the indenyl system may also form a benzindenyl system or a fluorenyl system.

Y is a substituted indenyl system which has an unsubstituted, substituted or condensed, heteroaromatic ring system which may have coordinated bonding or be uncoordinated. The heteroaromatic ring system preferably has intramolecular coordination to the chromium center.

Z is an unsubstituted, substituted or condensed, heterocyclic aromatic ring system which may contain, besides carbon ring members, heteroatoms selected from the group consisting of oxygen, sulfur, nitrogen and phosphorus. Examples of 5-membered ring heteroaryl groups, in which the ring members present, besides carbon atoms, may be from one to four nitrogen atoms or from one to three nitrogen atoms and/or a sulfur or oxygen atoms, are 2-furyl, 2-thienyl, 2-pyrrolyl, 3-isoxazolyl, 5-isoxazolyl, 3-isothiazolyl, 5-isothiazolyl, 1-pyrazolyl, 3-pyrazolyl, 5-pyrazolyl, 2-oxazolyl, 4-oxazolyl, 5-oxazolyl, 2-thiazolyl, 4-thiazolyl, 5-thiazolyl, 2-imidazolyl, 4-imidazolyl, 5-imidazolyl, 1,2,4-oxadiazol-3-yl, 1,2,4-oxadiazol-5-yl, 1,3,4-oxadiazol-2-yl and 1,2,4-triazol-3-yl. Examples of 6-membered heteroaryl groups, which may contain from one to four nitrogen atoms and/or a phosphorus atom, are 2-pyridinyl, 2-phosphabenzolyl 3-pyridazinyl, 2-pyrimidinyl, 4-pyrimidinyl, 2-pyrazinyl, 1,3,5-triazin-2-yl and 1,2,4-triazin-3-yl, 1,2,4-triazin-5-yl and 1,2,4-triazin-6-yl. The 5-membered-ring and 6-membered-ring heteroaryl groups here may also have substitution by $C_1$–$C_{10}$-alkyl, $C_6$–$C_{10}$-aryl, alkylaryl having from 1 to 10 carbon atoms in the alkyl radical and from 6 to 10 carbon atoms in the aryl radical, trialkylsilyl or halogens, such as fluorine, chlorine or bromine, or have been condensed with one or more aromatic systems or heteroaromatic systems. Examples of benzo-condensed 5-membered heteroaryl groups are 2-indolyl, 7-indolyl, 2 cumaronyl, 7-cumaronyl, 2-thionaphthenyl, 7-thionaphthenyl, 3-indazolyl, 7-indazolyl, 2-benzimidazolyl and 7-benzimidazolyl. Examples of 6-membered benzo-condensed heteroaryl groups are 2-quinolyl, 8-quinolyl, 3-cinnolyl, 8-cinnolyl, 1-phthalazyl, 2-quinazolyl, 4-quinazolyl, 8-quinazolyl, 5-quinoxalyl, 4-acridyl, 1-phenanthridyl and 1-phenazyl. The terminology and numbering for the heterocyclic systems has been taken from L. Pieser and K. Fieser, Lehrbuch der organischen Chemie, 3rd revised edition, Verlag Chemie, Weinheim 1957. Preference is given here to simple system which are easy to obtain and inexpensive and have been selected from the following group:

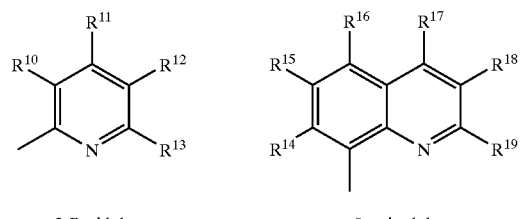

2-Pyridyl          8-quinolyl

Appropriate selection of the radicals $R^{10}$–$R^{19}$ can effect the activity of the catalyst and the molecular weight of the resultant polymer. Possible substituents $R^{10}$–$R^{19}$ are the radicals described for $R^1$—$R^8$ and halogens, e.g. fluorine, chlorine or bromine, and it is also possible, if desired, for two vicinal radicals $R^{10}$ to $R^{19}$ to have been bonded to give a 5- or 6-membered ring and to have substitution by halogens, such as fluorine, chlorine or bromine. Preferred radicals $R^{10}$–$R^{19}$ are hydrogen, methyl, ethyl, n-propyl, n-butyl, tert-butyl, n-pentyl, n-hexyl, n-heptyl, n-octyl, vinyl, allyl, benzyl, phenyl, naphthyl, biphenyl and anthranyl, and also fluorine, chlorine and bromine. Possible organosilicon substituents are in particular trialkylsilyl having from 1 to 10 carbon atoms in the alkyl radical, and in particular trimethylsilyl. Z is very particularly preferably unsubstituted or substituted, e.g. alkyl-substituted, quinolyl, in particular with linking at position 8, for example 8-quinolyl, 8-(2-methylquinolyl), 8-(2,3,4-trimethylquinolyl) or 8-(2,3,4,5,6,7-hexamethylquinolyl). This can be prepared very easily and also gives very good activities.

Various properties of the catalyst system may also be altered by varying the substituents $R^1$–$R^8$. The number and type of substituents, in particular $R^1$ and $R^7$, can affect the accessibility of the metal atom M to the olefins to be polymerized. It is therefore possible to modify the activity and selectivity of the catalyst with respect to various monomers, in particular bulky monomers. Since the substituents can also affect the rate of termination reactions of the growing polymer chain, they also provide a means of altering the molecular weight of the resultant polymers. The chemical structure of the substituents $R^1$–$R^8$ may therefore be varied over a wide range in order to achieve the desired results and obtain a tailored catalyst system. Examples of possible organocarbon substituents $R^1$–$R^8$ are the following: $C_1$–$C_{20}$-alkyl, linear or branched, e.g. methyl, ethyl, n-propyl, isopropyl, n-butyl, isobutyl, tort-butyl, n-pentyl, n-hexyl, n-heptyl, n-octyl, n-nonyl, n-decyl or n-dodecyl, 5- to 7-membered cycloalkyl, which may in turn have a $C_6$–$C_{10}$-aryl substituent, for example cyclopropane, cyclobutane, cyclopentane, cyclohexane, cycloheptane, cyclooctane, cyclononane or cyclododecane, $C_2$–$C_{20}$-alkenyl, linear, cyclic or branched, where the double bond may be internal or terminal, e.g. vinyl, 1-allyl, 2-allyl, 3-allyl, butenyl, pentenyl, hexenyl, cyclopentenyl, cyclohexenyl, cyclooctenyl or cyclooctadienyl, $C_6$–$C_{20}$-aryl, where the aryl radical may have other alkyl substituents, e.g. phenyl, naphthyl, biphenyl, anthranyl, o-, m-, p-methylphenyl, 2,3-, 2,4-, 2,5-, or 2,6-dimethylphenyl, 2,3,4-, 2,3,5-, 2,3,6-, 2,4,5-, 2,4,6- or 3,4,5-trimethylphenyl, or arylalkyl, where the arylalkyl group may have other alkyl substituents, e.g. benzyl, o-, m-, p-methylbenzyl, or 1- or 2-ethylphenyl, and if desired two groups $R^1$–$R^{16}$ may also have been bonded to give a 5- or 6-membered ring and the organic radicals $R^1$–$R^8$ may have halogen substituents, such as fluorine, chlorine or bromine. Possible radicals for $R^9$ in the organosilicon substituents $SiR^9_3$ are those described in some detail above for $R^1$–$R^8$, and if desired two $R^9$ radicals may also have been bonded to give a 5- or 6-membered ring. Examples of $SiR^9_3$ are trimethylsilyl, triethylsilyl, butyldimethylsilyl, tributylsilyl, triallylsilyl, triphenylsilyl and dimethylphenylsilyl. Preferred radicals $R^1$–$R^6$ are hydrogen, methyl, ethyl, n-propyl, isopropyl, n-butyl, isobutyl, tert-butyl, n-pentyl, n-hexyl, n-heptyl, n-octyl, vinyl, allyl, benzyl, phenyl, o-dialkyl- or dichloro-substituted, phenyl groups, trialkyl- or trichloro-substituted phenyl groups, naphthyl, biphenyl and anthranyl. Particular organosilicon substituents are trialkylsilyl groups having from 1 to 10 carbon atoms in the alkyl radical, in particular trimethylsilyl. Particularly preferred radicals $R^1$ and $R^2$ are methyl, ethyl, n-propyl, isopropyl, n-butyl, isobutyl, tert-butyl, n-pentyl, n-hexyl, n-heptyl, n-octyl, allyl, benzyl, phenyl and trialkylsilyl. $R^3$–$R^6$ are preferably hydrogen, methyl, ethyl, n propyl, isopropyl, n-butyl, isobutyl, tert-butyl, n-pentyl, n hexyl, n-heptyl, n-octyl, benzyl or phenyl. I (without Z) is preferably an indenyl group, e.g. indenyl, 2-methylindenyl, 2 ethylindenyl, 2-isopropylindenyl, 3-methylindenyl, 4-phenylindenyl, 2-methyl-4-phenylindenyl or 4-naphthylindenyl, or a benzindenyl system, e.g. benzindenyl or 2-methylbenzindenyl, and in very particular preferred transition metal complexes is an indenyl system.

In a particularly preferred embodiment Z is an unsubstituted or substituted 8-quinolyl system and $R^1$–$R^6$ are hydrogen.

The substituents X result, for example, from the selection of the appropriate chromium starting compounds used to synthesize the chromium complexes, but may also still be varied subsequently. Particular substituents X are the halogens, such as fluorine, chlorine, bromine or iodine, and among these in particular chlorine. Other advantageous ligands X are simple alkyl radicals, such as methyl, ethyl, propyl, butyl, vinyl, allyl, phenyl or benzyl. Other ligands X which may be mentioned merely as examples not to the exclusion of others are trifluoracetate, $BF_4^-$, $PF_6^-$, and also noncoordinating or weakly coordinating anions (see, for example, S. Strauss in Chem. Rev. 1993, 93, 927–942), such an $B(C_6F_5)_4^-$. The term anions when used for the ligands X implies no statement as to the nature of the bond to the transition metal M. For example, if X is a noncoordinating or weakly coordinating anion the interaction between the metal M and the ligand X is primarily electrostatic in nature. In contrast, if X is alkyl, for example, the bond is covalent. The various types of bonds are known to the skilled worker.

Amides, alcoholates, sulfonates, carboxylates and β-diketonates are also particularly suitable. Varying radicals $R^7$ and $R^8$ allows fine control of, for example, physical properties such as solubility. The radicals $R^7$ and $R^8$ used are preferably $C_1$–$C_{10}$-alkyl such as methyl, ethyl, n-propyl, n-butyl, tert-butyl, n-pentyl, n-hexyl, n-heptyl or n-octyl, or also vinyl, allyl, benzyl or phenyl. Some of these substituted ligands X are very particularly preferred, since they are obtainable from inexpensive and easily accessible starting materials. In a particularly preferred embodiment, therefore, X is dimethylamide, methanolate, ethanolate, isopropanolate, phenolate, naphtholate, triflate, p-toluenesulfonate, acetate or acetylacetonate.

The number n of ligand X depends on the oxidation state of the chromium center. It is therefore not possible to give a general value for n. Chromium is very probably in the oxidation state +3, but it is also possible to use complexes whose oxidation state does not correspond to that of the active catalyst. Complexes of this type may then be oxidized or reduced appropriately by suitable activators. Preference is given to the use of chromium complexes in the oxidation state +3.

The donor Z may have coordinative bonding to the a chromium. This may be intermolecular or intramolecular. The donor Z preferably has intramolecular coordinative bonding to the chromium, but this may change during the course of the polymerization.

The transition metal complex of the formula I may be monomeric, dimeric or trimeric, and m is then 1, 2 or 3. It is possible here, for example, for one or more ligands X to bridge two metal centers M.

Examples of preferred complexes are
1-(8-quinolyl)indenylchromium(III) dichloride,
1-(8-quinolyl)-2-methylindenylchromium(III) dichloride,
1-(8-quinolyl)-2-isopropylindenylchromium(III) dichloride,
1-(8-quinolyl)-2-ethylindenylchromium(III) dichloride,
1-(8-quinolyl)-2-tert-butylindenylchromium(III) dichloride,
1-(8-quinolyl)benzindenylchromium(III) dichloride,
1-(8-quinolyl)-2-methylbenzindenylchromium(III) dichloride,
1-(8-(2-methylquinolyl))indenylchromium(III) dichloride,
1-(8-(2-methylquinolyl))-2-methylindenylchromium(III) dichloride,
1-(8-(2-methylquinolyl))-2-isopropylindenylchromium(III) dichloride,
1-(8-(2-methylquinolyl))-2-ethylindenylchromium(III) dichloride,
1-(8-(2-methylquinolyl))-2-tert.butylindenylchromium(III) dichloride, 1-(8-(2-methylquinolyl)) benzindenylchromium(III) dichloride or
1-(8-(2-methylquinolyl))-2-methylbenzindenylchromium (III) dichloride.

The metal complexes, in particular the chromium complexes, may be attained in a simple manner by reacting the appropriate metal salts, e.g. metal chlorides, with the ligand anion (e.g. in a manner similar to the examples of DE 197 10615).

The novel olefin polymerization process may be combined with any known industrial polymerization process at from 20 to 300° C. and at from 5 to 4000 bar. Advantageous ranges of pressure and temperature for carrying out the process are therefore highly dependent on the polymerization method. The catalyst systems used according to the invention may, therefore, be used in any known polymerization process, e.g. in high-pressure polymerization in tubular reactors or autoclaves in suspension polymerization, in solution polymerization or in gas-phase polymerization. In high-pressure polymerization, which is usually carried out at from 1000 to 4000 bar, in particular from 2000 to 3500 bar, the polymerization temperatures set are also usually high. Advantageous temperature ranges for this high-pressure polymerization process are from 200 to 330° C., in particular from 220 to 270° C. In low-pressure polymerization processes the temperature set is usually at least a few degrees below the softening point of the polymer. Particular temperatures set in these polymerizations are from 50 to 180° C., preferably from 70 to 120° C. Suspension polymerization is usually carried out in a suspension mediums, preferably in an alkane. Particular alkanes which may form the suspension medium in the polymerization or copolymerization reaction include the higher olefins, such as propene, butene or hexene in the liquefied or liquid state. The polymerization temperatures are generally from −20 to 115° C., and the pressure is generally from 1 to 100 bar. The solids content of the suspension is generally from 10 to 80%. The operation may be carried out batchwise, e.g. in stirred autoclaves, or else continuously, e.g. in tubular reactors, preferably in loop reactors. The operation may in particular follow the Phillips PF-process, as described in U.S. Pat. No. 3,242,150 and U.S. Pat. No. 3,248,179.

Among the polymerization processes mentioned particular preference is given according to the invention to gas-phase polymerization, in particular in gas-phase fluidized-bed reactors, to solution polymerization and also to suspension polymerization, in particular in loop reactors or stirred tank reactors. The gas-phase polymerization may also be carried out by the methods of operation known as condensed, supercondensed or supercritical. It is also possible, if desired, for different or identical polymerization processes to be combined in series to form a polymerization cascade. It is also possible for an additive, e.g. hydrogen, to be used in the polymerization processes in order to regulate the properties of the polymer.

Some of the metal complexes according to the invention have in themselves little or no activity for polymerization, and in this case they are brought into contact with an activator, component (B), so that they can develop good activity for polymerization. Examples of possible activator compounds are those of aluminoxane type, in particular methylaluminoxane MAO. Aluminoxanes are prepared, for example, by controlled addition of water to alkylaluminum compounds, in particular trimethylaluminum. Aluminoxane preparations suitable as cocatalyst are available commercially. These are assumed to be a mixture of cyclic and linear compounds. The cyclic aluminoxanes may be given the summarized formula $(R^{20}AlO)_s$ and the linear aluminoxanes may be given the summarized formula $R^{20}(R^{20}AlO)_sR^{20}{}_2Al$ where s is the degree of oligomerization and is a number from about 1 to 50. Advantageous aluminoxanes essentially comprise aluminoxane oligomers having a degree of oligomerization of about from 1 to 30, and $R^{20}$ is preferably $C_1$–$C_6$-alkyl, particularly preferably methyl, ethyl, butyl or isobutyl.

Other activator components which may be used besides the aluminoxanes are those used in the procedure known as cationic activation of metallocene complexes. Activator components of this type are disclosed, for example, in EP-B1-0468537 and EP-B1-0427697. Particular activator compounds (B) of this type which are used are boranes, boroxines or borates, e.g. trialkylborane, triarylborane, trimethylboroxine, dimethylanilinium tetraarylborate, trityl tetraarylborate, dimethylanilinium boratabenzenes or tritylboratabenzenes (see WO-A-97/36937). Particular preference is given to the use of boranes or borates in each case having at least two perfluorinated aryl radicals. Particularly suitable activator compounds (B) used are those selected from the group consisting of aluminoxanes, dimethylanilinium tetrakispentafluorophenylborate, trityl tetrakispentafluorophenylborate and trispentafluorophenylborane.

It is also possible to use activator compounds with more powerful oxidizing properties, e.g. silver borates, in particular silver tetrakispentafluorophenylborate, or ferrocenium borates, in particular ferrocenium tetrakispentafluorophenylborate or ferrocenium tetraphenylborate.

Other activator components which may be used are compounds such as alkylaluminum compounds, in particular trimethylaluminum, triethylaluminum, triisobutylaluminum, tributylaluminum, dimethylaluminum chloride, dimethylaluminum fluoride, methylaluminum dichloride, methylaluminum sesquichloride, diethylaluminum chloride or aluminum trifluoride. It is also possible to use the hydrolysis products of alkylaluminum compounds with alcohols (see, for example, WO-A-95/10546).

Other activator compounds which may be used are alkyl compounds of lithium, magnesium or zinc, e.g. methylmagnesium chloride, methylmagnesium bromide, ethylmagnesium chloride ethylmagnesium bromide, butylmagnesium chloride, dimethylmagnesium, diethylmagnesium, dibutylmagnesium, methyllithium, ethyllithium, methylzinc chloride, dimethylzinc or diethylzinc.

It is sometimes desirable to use a combination of different activators. This is known, for example, in the case of the metallocenes, from which boranes, boroxines, (WO-A-93/16116) and borates are frequently used in combination with an alkylaluminum compound. It is generally also possible to use a combination of different activator components with the transition metal complex according to the invention.

The amount of the activator compounds to be used depends on the nature of the activator. The molar ratio of metal complex (A) to activator compound (B) may generally be from 1:0.1 to 1:10,000, preferably from 1:1 to 1:2000. The molar ratio of metal complex (A) to dimethylanilinium tetrakispentafluorophenylborate, trityl tetrakispentafluorophenylborate or trispentafluorophenylborane is from 1:1 to 1:20, preferably from 1:1 to 1:5, particularly preferably from 1:1 to 1:2, and to methylaluminoxane it is preferably from 1:1 to 1:2000, particularly preferably from 1:10 to 1:1000. Since many of the activators, e.g. alkylaluminum compounds, are at the same time used to remove catalyst poisons, the amount used of what are known as scavengers depends on the contamination in the other starting materials. However, the skilled worker can determine the ideal amount by simple tests.

The transition metal complex may be brought into contact with the activator compound(s) either prior to or after contacting the olefin to be polymerized. There may also be preactivation with one or more activator compounds prior to the mixing with the olefin, and further addition of the same or of other activator compounds once this mixture has come into contact with the olefin. Preactivation generally takes place at from 10 to 100° C., preferably from 20 to 80° C.

The catalysts (A) according to the invention may, if desired, also have been immobilized on an organic or inorganic support and used in supported for in the polymerization. This is a frequently used method of avoiding reactor deposits and of controlling the morphology of the polymer. Preferred support materials are silica gel, magnesium chloride, aluminum oxide, mesoporous materials, aluminosilicates and organic polymers, such as polyethylene, polypropylene or polystyrene, in particular silica gel or magnesium chloride.

The activator compounds (B) and the metal complex (A) may be brought into contact with the support in a variety of sequences or simultaneously. This is generally done in an inert solvent which can be filtered off or evaporated after the immobilization. However, it is also possible to use the supported catalyst while it in still moist. For example, the support may first be mixed with the activator compound(s) or the support may first be brought into contact with the polymerization catalyst. It is also possible to preactivate the catalyst with one or more activator compounds prior to mixing with the support. The amount of metal complex (A) (in mol) per gram of support material may vary widely, e.g. from 0.001 to 1. The preferred amount of metal complex (A) per gram of support material is from 0.001 to 0.5 mmol/g, particularly preferably from 0.005 to 0.1 mol/g. In one possible embodiment the metal complex (A) may also be prepared in the presence of the support material. Another type of immobilization is prepolymerization of the catalyst system with or without prior application to a support.

The novel ethylene copolymer may also be a constituent of a polymer mixture. The nature of the other polymer components in the mixture depends on how this will subsequently be used. The mixture may be prepared, for example, by blending one or more additional LLDPEs or HDPEs or LDPEs. On the other hand the polymer mixture may be prepared by simultaneous polymerization using a catalyst system which likewise has activity for olefin polymerization. Catalysts (c) which may be used here for preparing the blend polymers and, respectively, for the simultaneous polymerization are in particular traditional Ziegler Natta catalysts based on titanium, traditional Phillips catalysts based on chromium oxides, metallocenes, the complexes known as constrained-geometry complexes (see, for example, EP A 0 416 815 or EP a 0 420 436), nickel and palladium bisimine system (for the preparation of which see WO 98/03559 A1) or iron and cobalt pyridinebisimine compounds (for the preparation of which see WO 98/27124 A1). (C) may, however, also be another chromium complex according to the invention. The polymerization catalysts (C) may likewise have been applied to supports.

The novel ethylene copolymer may also form bimodal mixtures with other olefin polymers, in particular ethyelenehomo- and copolymers. These may be obtained either by the simultaneous use, as described above, of another catalyst suitable for olefin polymerization or by subsequent blending of the polymers and, respectively, copolymers which have been obtained separately.

The blends which comprise the novel olefin copolymers may further comprise two or three other olefin polymers or, respectively, olefin copolymers. These may, for example, be LDPEs (blends of these are described, for example, in DE-A1-19745047) or polyethylene homopolymers (blends of these are described, for example, in EP-B-100843), LLDPEs (as described, for example, in EP-B-728160 or WO-A-90/03414), or LLDPE/LDPE (WO 95/27005 or EP-B1-662989).

The proportion of the novel ethylene copolymer in the total polymer mixture is at least 40 to 99% by weight, preferably from 50 to 90% by weight.

The ethylene copolymers, polymer mixtures and blends may comprise auxiliaries and/or additives known per so, such as process stabilizers, stabilizers to protect from the effects of light or heat, customary additives, such as lubricants, antioxidants, antiblocking agents and antistats, or also, if desired, dyes. The nature and amount of these additives are familiar to the skilled worker.

It has also become apparent that the processing properties of the novel polymers can be further improved by admixing small amounts of fluoroelastomers or of thermoplastic polyesters. These fluoroelastomers are known per se as processing aids and are available commercially, for example by the trade names Viton® and Dynamar® (see also, for example, U.S. Pat. No. 3,125,547). The amounts of these preferably used are from 10 to 1000 ppm, particularly preferably from 20 to 200 ppm, based on the total weight of the novel polymer mixture.

The novel polymer may also subsequently be modified by grafting, crosslinking, hydrogenation or other functionalization reactions known to the skilled worker.

The polymer blends may be prepared by any known process, for example by introducing the granular component into a pelletizing assembly, e.g. a twin-screw kneader (ZSK) or Farrel kneader. It is also possible for a mixture in pellet form to be processed directly on a film production plant.

An example of a process for which the polymer mixtures are highly suitable is the production of films on blown film or cast film plants at high output rates. The film made from the polymer mixtures have very good mechanical properties, high shock resistance and high tear strength, together with good optical properties. They are particularly suitable for the packaging sector, and also for heavy duty sacks, and for the food and drink sector. The films moreover have only very little tendency toward blocking and can therefore be run on machinery without, or with only very little, addition of lubricants or antiblocking agents.

The good mechanical properties of the olefin copolymers prepared using the catalyst system according to the invention also make the suitable for producing fibers or moldings.

The examples below describe the invention.

Analysis

NMR samples were taken under an inert gas and where appropriate sealed by fusion. The internal standard used in the $^1$H and $^{13}$C NMR spectra were the solvent signals, and the chemical shift of these was converted to TMS basis. NMR measurements were made on a Bruker AC 200 and, in particular for COST experiments, on a Bruker AC 300.

Mass spectra were determined on a VG Micromass 7070 H and a Finnigan HAT 8230. High-resolution mass spectra were determined on Jeol JMS-700 and VG ZAB 2F equipment.

Elemental analyses were carried out on a Heraeus CHN-O-Rapid.

The comonomer content of the polymer (% $C_6$), its content of methyl side chains per 1000 carbon atoms of the polymer chain ($CH_3/1000$) and its density were determined by IR spectroscopy.

The TREF studies were carried out under the following conditions: solvent: 1,2,4-trichlorobenzene, flow rates 1 ml/min, heating rate 1° C./min, amount of polymer: 5–10 mg, support: kieselguhr.

The η value was determined using an automatic Ubbelohde viscometer (Laude PVS 1) with decalin as solvent at 130° (ISO1628 at 130° C., 0.001 g/ml of decalin).

The molar mass distributions and the averages Mn, Mw, Mw/Mn and Mz derived from these were determined by high-temperature gel permeation chromatography by a method based on DIN 55672 under the following conditions solvents 1,2,4-trichlorobenzene, flow rate: 1 ml/min, temperatures 140° C., calibration with PE standards.

Abbreviations in the tables below:
Cat. catalyst (the transition metal complex according to the invention)
Sup.cat. supported catalyst
T temperature during the polymerization
t duration of the polymerization
p pressure during the polymerization
Mw weight-average molar mass
Mn number-average molar mass
mp melting point
b Staudinger index (viscosity)
Density polymer density
$CH_3/1000$ number of methyl side chains per 1000 carbon atoms % $C_6$ comonomer content of the polymer in t by weight
General Synthesis Specification:

EXAMPLE 1

1-(8-quinolyl)indenylchromium(III) Dichloride 1.1. Preparation of 1-(8-quinolyl)indene 10.4 g (50 mmol) of 8-bromoquinoline in 100 ml of THF were cooled to about −100° C. 20 ml of n-BuLi (2.5M in hexane, 50 mmol) were added dropwise within a period of 5 min while the internal temperature was held below −80° C. After this addition stirring was continued at −80° C. for a further 15 min, and 6.6 g of 1-indanone (50 mmol) dissolved in 30 ml of THF were then added dropwise within a period of 10 min. The reaction mixture was then allowed to reach room temperature gradually and was then heated for 3 b at reflux. Once the mixture had cooled to room temperature, ice was added, followed by hydrochloric acid until the pH was about 1, followed by stirring for 30 min. The aqueous and organic phase were separated. The aqueous phase was mixed with ammonia solution until the pH was about 9 and extracted with ether. The combined organic phases were then evaporated to dryness in vacuo. The resultant viscous oil (1-(8-quinolyl)indan-1-ol ($8H_2O$)) vas mixed with hydrochloric acid until the pH was 0, heated at reflux for 2 hours and then neutralised. After work-up and drying it was possible to isolate 6.6 g of 1-(8-quinolyl)indene (55%) as a colorless solid.

1-(8-quinolyl)-indan-1-ol ($8H_2O$)

$^1$H NMR: (200 Mhz, $CDCl_2$) δ=2.58–2.87 (m, 3H, $CH_2$); 6.94 (dd, 1H, quinoline CH): 7.24–7.36 (m, 4H, CH): 7.44–7.50 (m, 2H, H3, H6); 7.70 (dd, 1H, quinoline CH); 8.23 (dd, 1H); 8.66 (s, br, 1H, OH); 8.92 (dd, 1H).

$^{12}$C NMR: (200 MHz, $CDCl_3$) δ=30.2, 44.8 ($CH_2$); 87.2 (COH); 120.8, 124.7, 125.1, 126.4, 126.9, 127.2, 127.5, 128.2, 137.9, 147.7 (CH); 127.4, 129.2, 142.6, 143.8, 146.7 (quart. C).

1-(8-quinolyl)inden m.p.: 108° C.

$^1$H-NMR: (200 MHz, $CDCl_3$) δ=3.69 (d, 2H, $CH_2$); 6.80 (t, 1H, =CH); 7.12–7.26 (m, 3H); 7.41 (dd, 1H); 7.55–7.64 (m, 2H); 7.81–7.88 (m, 2H); 8.21 (dd, 1H); 8.92 (dd, 1H).

$^{13}$C-NMR: (50 MHz, $CDCl_3$) δ=38.8 ($CH_2$); 121.0, 121.2, 123.8, 124.5, 125.8, 126.3, 127.8, 130.0, 133.5, 136.1, 150.0 (CH); 128.6, 135.9, 143.7, 144.0, 145.6, 146.7 (quartz. C).

MS (EI): m/z (%)=243 (65) [M$^+$]; 242 (100) [M$^+$−H].

HR-MS (EI): 243.1048 (calc.), 243.1038 (found).

C,H,N analysis: calc. 88.86% C, 5.39% H, 5.75% N found: 87.55% C, 5.52% H, 5.92% N.

1.2. Preparation of dichloro[1-(8-quinolyl)indenyl]chromium (III):

0.05 g of potassium hydride (1.23 mmol) were suspended in 20 ml of THF and 0.3 g of 1-(8-quinolyl)indene (1.23 mol) were slowly added. The resultant violet suspension was stirred for three hours at room temperature and then added dropwise to a mixture of 0.46 g of chromium(III) chloride 3THF (1.23 mmol) in 50 ml of THF. Once this addition was complete the mixture was stirred for a further 16 hours. The solvent was removed in vacuo and the resultant solid extracted several times with hot toluene on a G4 frit. Once the solvent had been distilled off from the combined extracts the product was obtained as a green powder. This was washed several times with hexane and dried under HV, giving 0.22 g of dichloro[1-(8-quinolyl)indenyl]chromium (III) (50%).

Another method is to take up the residue in methylene chloride, separate off potassium chloride and remove the solvent, thus again obtaining the chromium complex.

MS (EI): m/z (%)=364 (0.2, M$^+$); 329 (0.1, M$^+$−Cl); 242 (100, Ind (quinoline)$^+$)

HR-EI-MS: 363.97519 (calc.), 363.97615 (meas.)

EXAMPLES 2 And 3

Copolymerization of Ethene with 1-hexene

The polymerization experiments were carried out in a 1 l four-necked flask with a contact thermometer, a stirrer with teflon blade, a heating mantle and a gas inlet tube. The initial charge used, at 40° C. under argon, was the amount given in Table 1 of dichloro[1-(8-quinolyl)indenyl]chromium(III) in 250 ml of toluene. The amount of 1.6 M MAO solution in toluene added during the activation with MAO in each case is given in Table 2.

5 ml of hexene formed an initial charge prior to ethylene addition, and about 20 to 40 l/h of ethylene were then passed through at atmospheric pressure for one hour. The remaining amount of hexene was fed within a period of 15 min via a dropping funnel.

The reaction was terminated by adding a mixture made from 15 ml of concentrated hydrochloric acid and 50 ml of methanol and stirring was then continued for 15 in. After adding a further 250 ml of methanol and stirring for 15 ml the product was filtered off, washed three times with methanol and dried at 70° C. Table 1 gives the data for the polymerization and the product.

TABLE 1

| Ex. | Cat. amount. [mg] ($\mu$mol) | MAO [mmol] | Al:Cr | Cr:B | Hexene [ml] | T [°C.] | Activity [kg/molCr·h] | Yield [g] ([min]) | Density [g/cm$^3$] | $\eta$ [dl/g] |
|---|---|---|---|---|---|---|---|---|---|---|
| 2 | 6.1 (16.7) | 8.5 | 510 | — | 30 | 60 | 1400 | 23.4 (60') | 0.881 | 2.15 |
| 3 | 5.8 (15.8) | 8 | 500 | — | 30 | 52 | 1020 | 16.1 (60') | 0.884 | 6.44 |

| Ex. | CDBI [%] | Ta [°C.] | $\sigma$ | Density [g/cm$^3$] | Eta [dl/g] | Mw [g/mol] | Mn [g/mol] | Mw/Mn — | C6 [%] | m.p. [°C.] | CH$_3$ [/1000°C.] |
|---|---|---|---|---|---|---|---|---|---|---|---|
| 2 | 90 | 53.2 | 9.9 | 0.881 | 2.15 | 132567 | 49540 | 2.68 | 20 | 61.3 | 37.1 |
| 3 | 95 | 59.3 | 11.6 | 0.884 | 6.44 | 740298 | 224534 | 3.3 | 13 | 90.9 | 23.5 |

Data for polymerization and product in Examples 2 and 3

We claim:

1. A copolymer of ethylene with $C_3$–$C_9$-$\alpha$-olefins, which has a polydispersity $M_w/M_n$ of from 2 to 10, a density of from 0.85 to 0.93 g/cm$^3$, a proportion of from 10 to 40% by weight of comonomer and a molar mass $M_n$ above 150,000 g/mol and a comonomer composition distribution index above 70%.

2. The copolymer as claimed in claim 1, wherein said density is from 0.88 to 0.93 g/cm$^3$.

3. The copolymer as claimed in claim 1, wherein said comonomer composition distribution breadth index is above 90%.

4. The copolymer as claimed in claim 1, wherein said $\alpha$-olefins are selected from the group consisting of propene, 1-butene, 1-hexene and 1-octene.

5. The copolymer as claimed in claim 1, wherein said polydispersity Mw/Mn is from 2 to 4.

6. The copolymer as claimed in claim 1, wherein said molecular weight Mn is above 200,000 g/mol.

7. A polymer mixture which comprises said at least one of the copolymer of ethylene with $C_3$–$C_9$-$\alpha$-olefins as claimed in claim 1.

8. A fiber, a film or a molding which comprises the copolymer of ethylene with $C_3$–$C_9$-$\alpha$olefins as claimed in claim 1.

9. A fiber, a film or a molding which comprises the copolymers of ethylene with $C_3$–$C_{12}$-$\alpha$-olefins as claimed in claim 1.

10. The copolymer of claim 2, wherein the comonomer composition distribution breadth index is above 90%, the $\alpha$-olefins are selected from the group consisting of propene, 1-butene, 1-hexene and 1-octene, polydispersity M2/Mn is from 2 to 4 and molecular weight Mn is above 200,000 g/mol.

11. The copolymers of claim 10 wherein the comonomer is hexene-1.

12. The copolymer of claim 11 wherein the CDBI is about 95%.

13. The copolymer of claim 11 wherein the density is about 0.88, the CDBI is about 95% and the polydispersity Mw/Mn is about 3.

14. The copolymer of claim 13 wherein the density is 0.884, the CDBI is 95%, the molecular weight Mn is about 224,000 and the polydispersity is 3.3.

* * * * *